United States Patent
Dragan

(10) Patent No.: US 10,814,751 B2
(45) Date of Patent: Oct. 27, 2020

(54) METHOD FOR ADJUSTING A TEMPERATURE OF A SEAT

(71) Applicant: Continental Automotive GmbH, Hannover (DE)

(72) Inventor: Andrei Dragan, Sibiu (RO)

(73) Assignee: Continental Automotive GmbH (DE)

(*) Notice: Subject to any disclaimer, the term of this patent is extended or adjusted under 35 U.S.C. 154(b) by 96 days.

(21) Appl. No.: 16/184,115

(22) Filed: Nov. 8, 2018

(65) Prior Publication Data

US 2019/0168646 A1    Jun. 6, 2019

(30) Foreign Application Priority Data

Dec. 4, 2017 (EP) .................................... 17465579

(51) Int. Cl.
| | |
|---|---|
| *A47C 7/74* | (2006.01) |
| *B60N 2/00* | (2006.01) |
| *G05D 23/19* | (2006.01) |
| *B60N 2/56* | (2006.01) |

(52) U.S. Cl.
CPC .................. *B60N 2/56* (2013.01); *A47C 7/74* (2013.01); *B60N 2/002* (2013.01); *G05D 23/19* (2013.01)

(58) Field of Classification Search
CPC . A47C 7/74; B60N 2/002; B60N 2/56; G05D 23/19
See application file for complete search history.

(56) References Cited

U.S. PATENT DOCUMENTS

| | | | |
|---|---|---|---|
| 6,505,780 B1 | 1/2003 | Yassin et al. | |
| 6,719,624 B2 | 4/2004 | Hayashi et al. | |
| 8,066,324 B2* | 11/2011 | Nathan | B60N 2/5685 |
| | | | 297/180.1 |
| 8,500,194 B2* | 8/2013 | Fischer | B60N 2/002 |
| | | | 297/180.1 |
| 9,676,308 B2* | 6/2017 | Zhang | B60N 2/5621 |
| 9,676,310 B2* | 6/2017 | Fitzpatrick | B60N 2/56 |
| 10,299,520 B1* | 5/2019 | Shaffer | A61B 5/02055 |
| 2004/0021346 A1 | 2/2004 | Morinet et al. | |
| 2006/0180647 A1 | 8/2006 | Hansen | |
| 2009/0001778 A1* | 1/2009 | Nathan | B60N 2/5685 |
| | | | 297/180.12 |
| 2015/0008710 A1* | 1/2015 | Young | B60N 2/0276 |
| | | | 297/217.3 |
| 2015/0025738 A1 | 1/2015 | Tumas et al. | |
| 2015/0230524 A1 | 8/2015 | Stevens et al. | |
| 2017/0268793 A1 | 9/2017 | Cardonha et al. | |

FOREIGN PATENT DOCUMENTS

| | | |
|---|---|---|
| DE | 10026656 A1 | 12/2001 |
| DE | 102008059553 A1 | 6/2010 |
| JP | 2006132126 * | 5/2006 |
| JP | 2006132126 A | 5/2006 |
| JP | 4259258 B2 | 4/2009 |

OTHER PUBLICATIONS

Great Britain Combined Search and Examination Report for Application No. GB1720210.2, dated May 18, 2018—3 pages.

* cited by examiner

*Primary Examiner* — Abdelmoniem I Elamin
(74) *Attorney, Agent, or Firm* — RatnerPrestia

(57) ABSTRACT

A method for adjusting a temperature of a temperature adjustable seat is disclosed. The method includes detecting a clothing item of an occupant of the temperature adjustable seat; determining a type of the detected clothing item; and adjusting the temperature of the temperature adjustable seat based on the determined type of the detected clothing item.

14 Claims, 6 Drawing Sheets

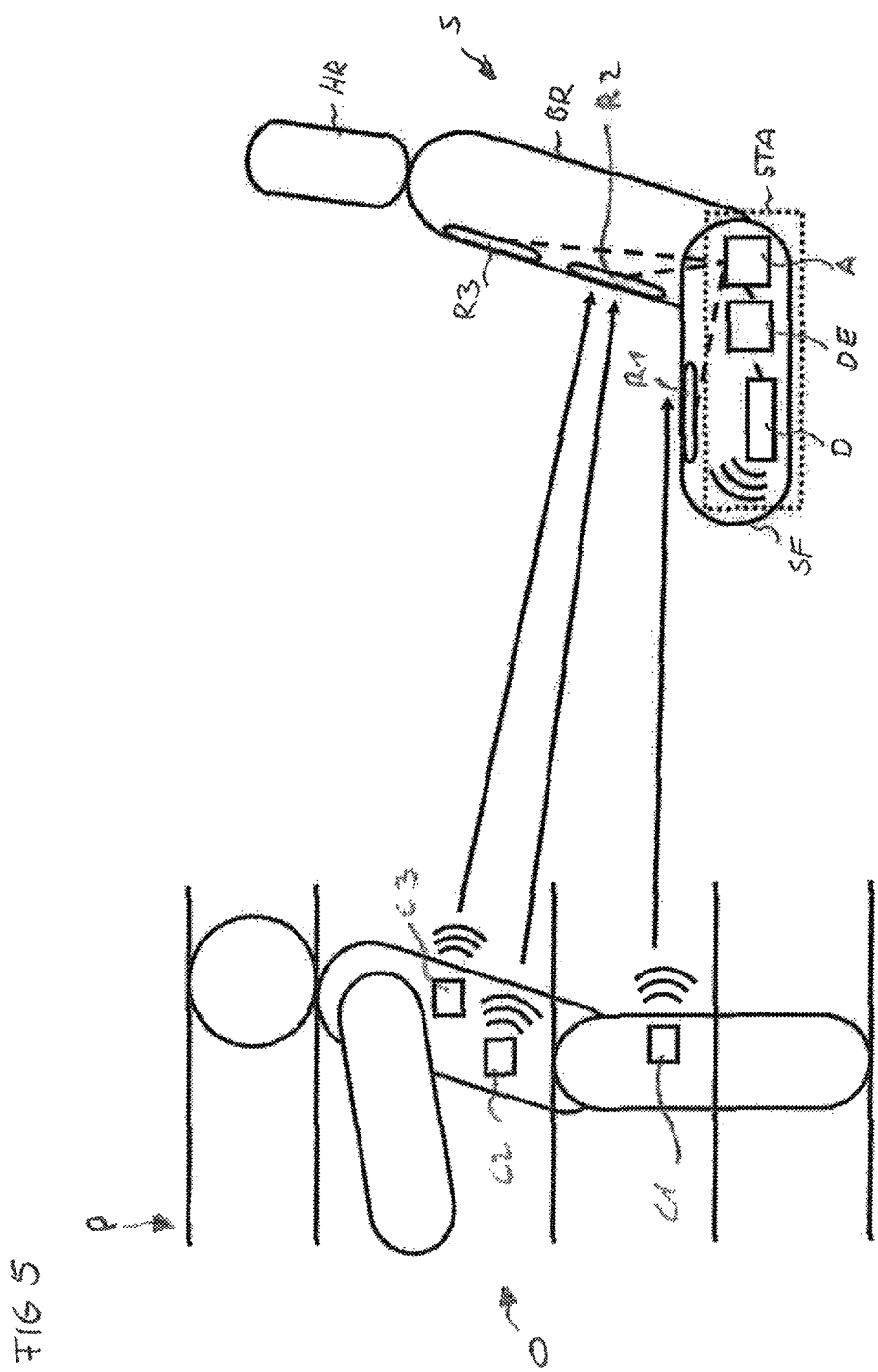

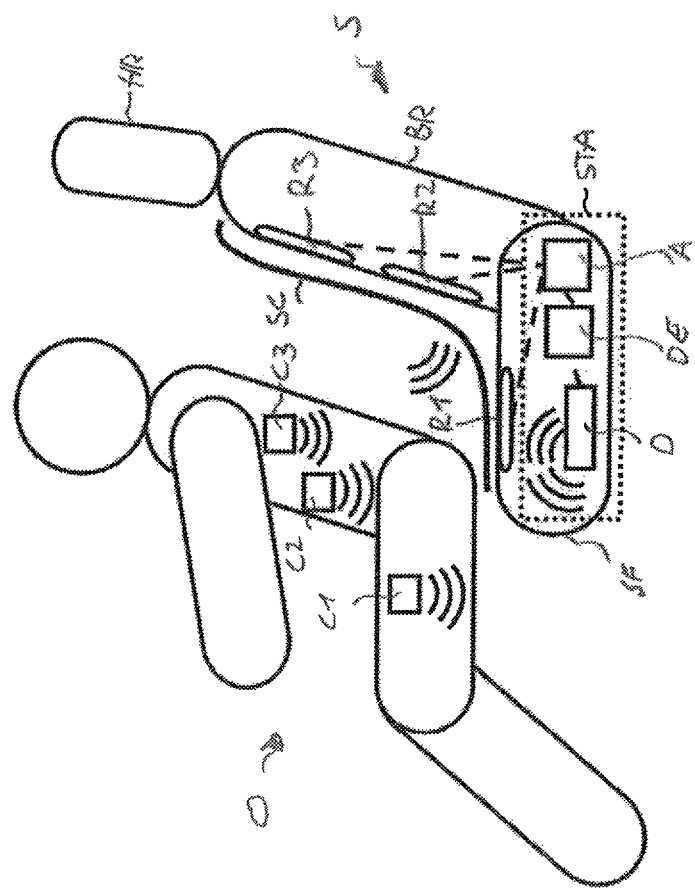

METHOD FOR ADJUSTING A TEMPERATURE OF A SEAT

CROSS REFERENCE TO RELATED APPLICATION

This application claims priority to European Patent Application No. EP17465579, filed Dec. 4, 2017, the contents of such application being incorporated by reference herein.

FIELD OF THE INVENTION

The present invention relates to a method for adjusting a temperature of a temperature adjustable seat, in particular a temperature adjustable vehicle seat. The present invention further relates to a seat temperature adjustment assembly for adjusting a temperature of a temperature adjustable seat, as well as to a temperature adjustable seat including such a seat temperature adjustment assembly.

BACKGROUND OF THE INVENTION

Temperature adjustable seats and in particular temperature adjustable vehicle seats usually include either a manual seat temperature control or a quasi-automatic seat temperature control. In a manual seat temperature control, an occupant of the temperature adjustable seat can adjust the temperature of the seat by manually choosing between a set of predetermined temperature settings, for example low heating, fast heating, cooling etc. In a quasi-automatic seat temperature control, a control of the seat takes into account the estimated temperature of the occupant and adjusts a temperature of the seat based on the estimated temperature of the occupant. One problem of adjusting a temperature of the seat using a quasi-automatic temperature control is, however, that the temperature estimation is not reliable and therefor produces erroneous temperature adjustments of the seat.

SUMMARY OF THE INVENTION

An aspect of the invention is a method for adjusting a temperature of a temperature adjustable seat which is more reliable.

According to a first aspect of the present invention, a method for adjusting a temperature of a temperature adjustable seat is provided. The method comprises the steps of detecting a clothing item of an occupant of the temperature adjustable seat, determining the type of the detected clothing item, and adjusting a temperature of the temperature adjustable seat based on the determined type of the detected clothing item. By taking into account the type of clothing item of the occupant, an influence of the clothing item on a temperature estimation for the seat can be reduced and the temperature of the temperature adjustable seat can be adjusted more accurately.

According to an embodiment of the method, the temperature adjustable seat is a temperature adjustable vehicle seat.

According to a further embodiment, the clothing item is detected by a detection unit included in the temperature adjustable seat and/or the type of the detected clothing item is determined by a determination unit included in the temperature adjustable seat. By including a detection unit and/or a determination unit in the temperature adjustable seat, the temperature adjustable seat becomes an intelligent seat which is able to adjust its temperature fully automatic taking into account the type of clothing of the occupant. The temperature adjustable seat therefor no longer needs external control units such as control units used in an air-conditioning unit of a vehicle.

According to a further embodiment, the step of determining a type of the detected clothing item comprises the step of determining a clothing specific information associated with the detected clothing item. The clothing specific information can be for example the type of the clothing item such as "jacket", "shirt", "trousers", "suit", etc. or can be the nature of the clothing item such as "down jacket", "silk suit" etc. By determining the clothing specific information associated with the detected clothing item, an adjustment of the temperature of the temperature adjustable seat can be more accurate. For example, it may be possible to distinguish between a winter jacket (such as a down jacket) and summer jacket (such as a cardigan).

According to a further embodiment, the clothing specific information includes a parameter indicative of a thermal transfer behaviour of the clothing item. Such a parameter can be, for example, a heat transfer coefficient of the clothing item. The parameter indicative of a thermal transfer behavior can be used to adjust the temperature of the temperature adjustable seat such that, for example, the occupant feels the change of the temperature quicker. If, for example the detected clothing item is a down jacket with a low heat transfer coefficient, the method may increase the temperature of the seat faster than if, for example, the detected clothing item were a cardigan with a high heat transfer coefficient.

According to a further embodiment, the clothing specific information is customizable to personal preferences of the occupant. For example, the occupant could adjust the clothing specific information such that the method increases the temperature of the seat only moderately, although he wears a down jacket. As another example, the occupant could adjust the clothing specific information of a specific cardigan so that this specific cardigan is then treated as, for example, a down jacket.

According to a further embodiment, the step of determining a type of the detected clothing item further comprises the steps of comparing the determined type of the detected clothing item with a predetermined reference information, and generating a seat temperature adjustment signal based on the comparison. The predetermined reference information may be, for example, a category information which lists clothing items according to, for example, a summer outfit or a winter outfit. The method then compares the determined type of the detected clothing item with the listed clothing items, assigns it to the summer outfit category or the winter outfit category and generates a seat temperature adjustment signal based on whether the determined type of the detected clothing item belongs to a summer outfit or a winter outfit. As another example, the predetermined reference information may be a category information which lists clothing items according to long-sleeved clothing items, short-sleeved clothing items and trousers. The method then compares the determined type of the detected clothing item with the listed clothing items in the categories, assigns the determined type of the detected clothing item to the appropriate category, and generates a seat temperature adjustment signal taking into account the category.

According to a further embodiment, the step of detecting a clothing item of the occupant further comprises the step of detecting a plurality of clothing items of the occupant, the step of determining a type of the detected clothing item further comprises the step of determining for each detected clothing item of the plurality of detected clothing items the type of clothing item, and the method further comprises the step of selecting from the plurality of detected clothing items at least one clothing item that is considered to be taken into account for adjusting a temperature of the temperature adjustable seat based on the determined type of each detected clothing item. For example, the method may detect a suit, a shirt and the underwear of the occupant and then select from the detected clothing items (suit, shirt and underwear) only the suit and the shirt for adjusting the temperature of the temperature adjustable seat. With this embodiment, it is possible to take into account only relevant clothing items of the occupant. This saves processing time of the method and still produces a reliable temperature adjustment signal for the temperature adjustable seat.

According to a further embodiment, the temperature adjustable seat includes a plurality of temperature adjustable regions (such as a lower back region, an upper back region and a sitting face region) and the method further comprises the steps of assigning the determined type of the detected clothing item to at least one of the plurality of temperature adjustable regions, and performing the step of adjusting a temperature of the temperature adjustable seat by adjusting a temperature of the at least one assigned temperature adjustable region and/or by adjusting a temperature of at least one temperature adjustable region not assigned to the determined type of the detected clothing item. With this embodiment, a detected type of clothing item such as, for example, a down jacket, may be assigned to the upper back and the lower back region of the temperature adjustable seat and a temperature of the temperature adjustable seat may be adjusted by adjusting a temperature of the upper back and lower back regions. It may also be possible, that with the above example, the method adjusts a temperature of the temperature adjustable seat by adjusting a temperature of only the sitting face region (for example, because the method realises that the occupant may feel warm enough in the upper and lower back region due to the detected down jacket).

According to a further embodiment, the step of assigning the determined type of the detected clothing item to at least one of the plurality of temperature adjustable regions further comprises the steps of detecting a body proportion of the occupant and assigning the determined type of the detected clothing item with at least one of the plurality of temperature adjustable regions based on the detected body proportion. With this embodiment, a body proportion of the occupant can be taken into account for assigning the determined type of detected clothing item to the temperature adjustable regions of the seat. For example, the method may distinguish between a down jacket worn by a tall occupant compared to a down jacket worn by a short occupant and, in case the occupant is a tall occupant, assigns the down jacket to the upper and lower back regions, whereas in case the occupant is a short occupant, assigns the down jacket to only the lower back region.

According to a further embodiment, the method further comprises the steps of determining whether the temperature adjustable seat is occupied, and performing the step of detecting a clothing item only if the temperature just proceed is occupied. With this embodiment, the method is only performed if the temperature adjustable seat is occupied saving energy and freeing up processing power for performing other processes.

According to a further embodiment, the temperature adjustable seat includes a seat cover and the method further comprises the steps of determining a parameter indicative of the material of the seat cover, and adjusting a temperature of the temperature adjustable seat based on the determined parameter. With this embodiment, it is possible to, for example, distinguish between a leather seat cover and a fabric seat cover. Thus, for example, if the seat cover is a leather seat cover, the method may increase the temperature of the seat more quickly compared to a fabric seat cover so that the occupant does not have the feeling of a "cold leather seat".

According to a second aspect of the present invention, a seat temperature adjustment assembly for adjusting a temperature of a temperature adjustable seat, in particular a temperature adjustable vehicle seat, is provided. The seat temperature adjustment assembly comprises a detection unit configured to detect a clothing item of an occupant of the temperature adjustable seat, a determination unit configured to determine a type of the detected clothing item, and an adjustment unit configured to adjust a temperature of the temperature adjustable seat based on the determined type of the detected clothing item.

According to a third aspect of the present invention, a temperature adjustable seat, in particular a temperature adjustable vehicle seat, is provided. The temperature adjustable seat comprises at least one temperature adjustable region configured to adjust a temperature of the temperature adjustable seat, and a seat temperature adjustment assembly of the second aspect wherein the adjustment unit is connected to the at least one temperature adjustable region for adjusting a temperature of the at least one temperature adjustable region (thereby adjusting a temperature of the temperature adjustable seat).

Exemplary embodiments of the method for adjusting a temperature of a temperature adjustable seat are considered to be applicable to the seat temperature adjustment assembly as well as to the temperature adjustable seat.

BRIEF DESCRIPTION OF THE DRAWINGS

Exemplary embodiments of aspects of the invention are described by the accompanying drawings, which are incorporated herein and constitute a part of the specification. In the drawings:

FIG. 5 is a schematic view of a flowchart of another embodiment of the present invention taking into account a body proportion of the occupant of the temperature adjustable seat; and FIG. 6 is a schematic view of a flowchart of another embodiment of the present invention taking into account a material of a seat cover.

DETAILED DESCRIPTION OF THE PREFERRED EMBODIMENTS

In the following, embodiments of the method for adjusting a temperature of a temperature adjustable seat are explained.

Figure 1:
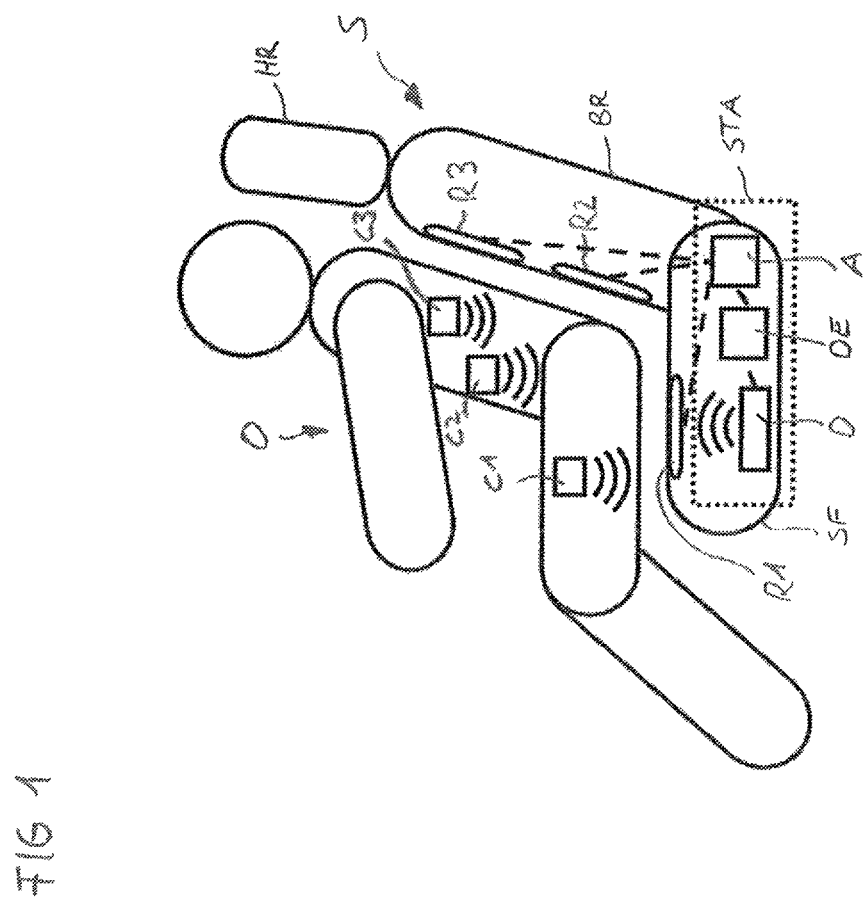
FIG. 1 is a schematic view of an embodiment of the present invention and shows a temperature adjustable seat capable of detecting a clothing item of an occupant and determining the type of the detected clothing item.

FIG. 1 shows a schematic view of a temperature adjustable seat S which is for example a temperature adjustable vehicle seat. Of course, temperature adjustable seat S may be used in other applications as well, such as in an airplane, on a train, etc.

As can be seen in FIG. 1, temperature adjustable seat S includes a backrest BR and a sitting face SF as well as a headrest HR. Temperature adjustable seat S further includes three temperature adjustable regions configured to adjust a temperature of temperature adjustable seat S. A first temperature adjustable region R1 is arranged in sitting face SF, a second temperature adjustable region R2 is arranged in a lower back region of backrest BR and a third temperature adjustable region R3 is arranged in an upper back region of backrest BR.

FIG. 1 further shows an occupant O of temperature adjustable seat S. Occupant O may be setting on temperature adjustable seat S, as shown. Occupant O may also be standing near temperature adjustable seat S. Occupant O wears a plurality of clothing items, such as a first clothing item C1, for example, trousers, a second clothing items C2, for example, a shirt, and a third clothing item C3, for example, a jacket.

As can be further seen in FIG. 1, temperature adjustable seat S includes a seat temperature adjustment assembly STA. Seat temperature adjustment assembly STA includes a detection unit D configured to detect clothing items C1, C2, C3 of occupant O. A detection of clothing items C1, C2, C3 may be performed wirelessly for example using RFID or NFC technologies or other suitable wireless communication means.

Seat temperature adjustment assembly STA further includes a determination unit DE configured to determine a type of the detected clothing items C1, C2, C3. The type of detected clothing items C1, C2, C3 may be, for example, "trousers", "shirt", "jacket". The type of detected clothing items C1, C2, C3 may be provided in or on clothing items C1, C2, C3, for example, using RFID tags sewn into or onto clothing items C1, C2, C3.

Seat temperature adjustment assembly STA further includes an adjustment unit A configured to adjust a temperature of temperature adjustable seat S based on the determined type of detected clothing items C1, C2, C3. For this, adjustment unit A is connected to temperature adjustable regions R1, R2, R3 and generates a seat temperature adjustment signal to each of the temperature adjustable regions R1, R2, R3, by which the temperature of each temperature adjustable region R1, R2, R3 is adjusted, thereby adjusting the temperature of temperature adjustable seat S in the sitting face region, the lower back region and the upper back region. Adjustment unit A may send one temperature adjustment signal to all temperature adjustable regions R1, R2, R3, or individual seat temperature adjustment signals to each temperature adjustment region R1, R2, R3.

Figure 2:
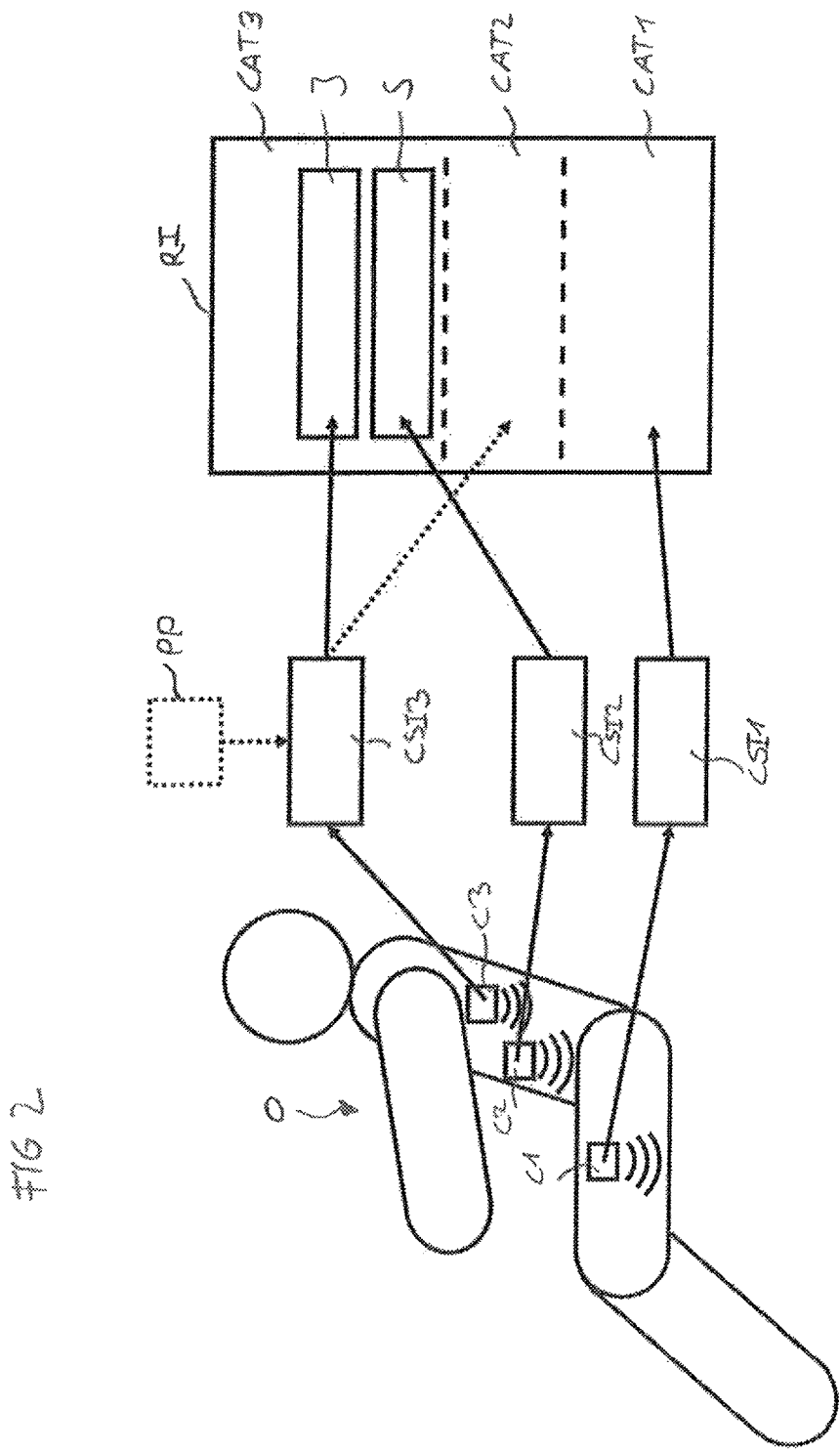
FIG. 2 is a schematic view of a flowchart of another embodiment of the present invention showing how a detected clothing item is used for adjusting a temperature of a temperature adjustable seat.

Referring now to FIG. 2, a schematic flowchart is illustrated, which explains in more detail how the detected clothing items C1, C2, C3 are used for adjusting a temperature of temperature adjustable seat S.

For each detected clothing item C1, C2, C3, a clothing specific information CSI1, CSI2, CSI3 is determined. Clothing specific information CSI1, CSI2, CSI3 may be the type of clothing item, for example, "trousers", "suit" or "jacket", as mentioned. Clothing specific information CSI1, CSI2, CSI3 may also be the nature of detected clothing items C1, C2, C3, such as "jeans trousers", "silk shirt" and "down jacket". Clothing specific information CSI1, CSI2, CSI3 may even be a parameter indicative of a thermal transfer behaviour of detected clothing items C1, C2, C3. For example, jeans trousers may have a parameter indicative of a thermal transfer behaviour of 1 (indicating average thermal transfer behavior), a silk shirt may have a parameter indicative of a thermal transfer behaviour of 2 (indicating a larger than average thermal transfer behaviour) and a down jacket may have a parameter indicative of a thermal transfer behaviour of 0.5 (indicating a less than average thermal transfer behaviour). A parameter indicative of a thermal transfer behavior by be, for example, a heat transfer coefficient of clothing items C1, C2, C3. Clothing specific information CSI1, CSI2, CSI3 may be included, for example, in the RFID tag of clothing items C1, C2, C3 and/or may be provided by a manufacturer of clothing items C1, C2, C3.

In addition, it is also possible that occupant O or any other person adds, changes or customizes clothing specific information CSI1, CSI2, CSI3 according to their personal preferences. For example, occupant O may overwrite or amend clothing specific information CSI3 with the help of an app or with the help of other suitable means so that clothing specific information CSI3 is customized to the liking of occupant O or any other person. This is illustrated schematically by a dashed box PP on top of clothing specific information CSI3. Of course, clothing specific information CSI1, CSI2 may also be customizable.

As an example, occupant O could amend clothing specific information CSI3 such that it no longer reads "down jacket" but "cardigan". As another example, occupant O could adjust clothing specific information CIS3 such that it no longer reads "parameter indicative of a thermal transfer behavior=0.5" but "parameter indicative of a thermal transfer behavior=1". As a result, the thermal transfer behavior of the down jacket of occupant O is no longer 0.5 (as originally provided) but 1 indicating an average thermal transfer behavior. This enables occupant O (or any other person) to change the adjustment of temperature adjustable seat S to his likings.

Once the clothing specific information CSI1, CSI2, CSI3 is determined for each detected clothing item C1, C2, C3, the clothing specific information CSI1, CSI2, CSI3 is then compared with predetermined reference information RI. The predetermined reference information RI may be, for example, a list of categories listing clothing items according to, for example, a summer outfit or a winter outfit. As another example, the predetermined reference information may be a list of categories listing clothing items according to long-sleeved clothing items, short-sleeved clothing items and trousers. Other examples are conceivable, for example, look-up tables of heat transfer coefficients or the like.

As an example, in FIG. 2, predetermined reference information RI lists three categories CAT1, CAT2, CAT3. Category CAT1 may be, for example, "trousers", category CAT2 may be, for example, "short-sleeved clothing items" and category CAT3 may be, for example, "long-sleeved clothing items". The procedure then compares, for each detected clothing item C1, C2, C3, the determined clothing specific reference information CSI1, CSI2, CSI3 (or more generally the determined type of clothing item) with the predetermined reference information RI and assigns each determined clothing specific information CSI1, CSI2, CSI3 to the appropriate category CAT1, CAT2, CAT3. For example, clothing specific information CSI3 "down jacket" of clothing item C3 is assigned to category CAT3 "long-sleeved clothing items", clothing specific information CSI2 "silk shirt" of clothing item C2 is also assigned to category CAT3 "long-sleeved clothing items" and clothing specific information CSI1 "jeans trousers" is assigned to category CAT1 "trousers".

As another example, in FIG. 2, predetermined reference information RI may also include sub-categories. As an example, category CAT3 "long-sleeved clothing items" includes a sub-category J for "jacket" and a sub-category S for "shirt".

Based on the assigned category CAT1, CAT2, CAT3 (and sub-categories), the procedure then generates a seat temperature adjustment signal which takes into account the assigned category (and sub-category). For example, a seat temperature adjustment signal corresponding to category CAT 3 "long-sleeved clothing items" may cause a quicker temperature rise of temperature adjustable seat S than a seat temperature adjustment signal corresponding to category CAT2 "short-sleeved clothing items" so that occupant O feels the temperature rise quicker (despite wearing a down jacket).

As already mentioned and also shown in FIG. 2, occupant O or any other person may customize clothing specific information CSI3 (or clothing specific information CSI1, CSI2) according to their personal preferences. As an example, occupant O may change clothing specific information CSI3 such that clothing item C3 "down jacket" is no longer assigned category CAT3 but category CAT2 "short-sleeved clothing items". This may be suitable, for example, if occupant O wants the temperature of temperature adjustable seat S to increase only moderately (because occupant O wears a down jacket and is fine with a moderate temperature increase).

Figure 3:
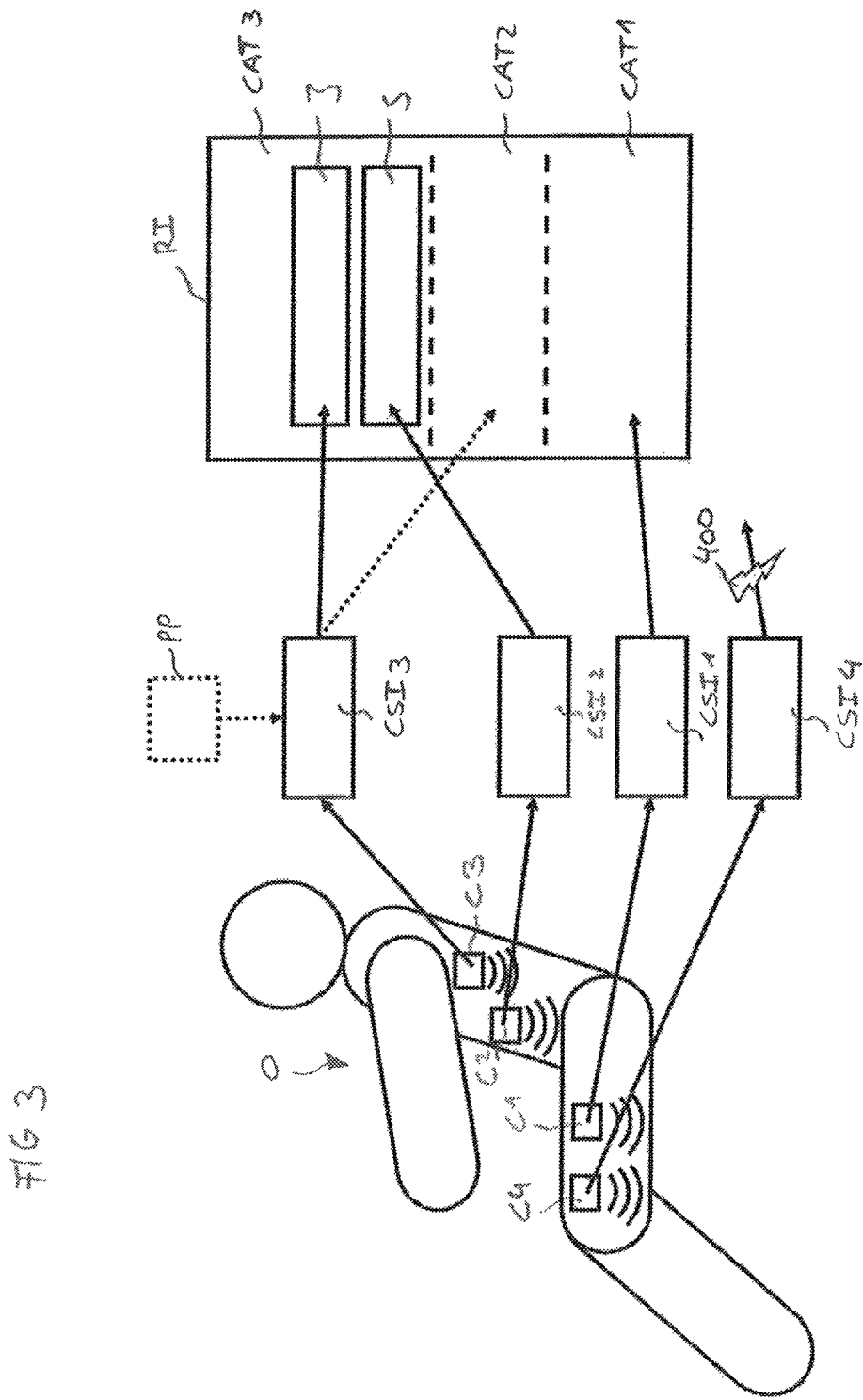
FIG. 3 is a schematic view of a flowchart of another embodiment of the present invention showing how a detected clothing item is not used for adjusting a temperature of a temperature adjustable seat.

Referring now to FIG. 3, a schematic flowchart is illustrated, which explains how a further clothing item C4 is detected but not used for adjusting a temperature of temperature adjustable seat S.

In FIG. 3, occupant O wears a fourth clothing item C4. In the specific example, clothing item C4 is underwear such as underpants of occupant O which also include an RFI tag or other wireless information transmission means. The procedure detects clothing item C4 and determines from clothing specific information CSI 4 that clothing item C4 is "underpants". The procedure then compares clothing specific information CSI 4 with reference information RI. If clothing specific information CSI4 (in this example "underpants") is not listed in reference information RI, the procedure does not take into account clothing item C4 for adjusting a temperature of temperature adjustable seat S. This is illustrated by arrow 400. It is also conceivable, that clothing item C4 is listed in reference information RI but reference information RI list clothing item C4 as "do not treat for temperature adjustment of temperature adjustable seat S".

Figure 4:
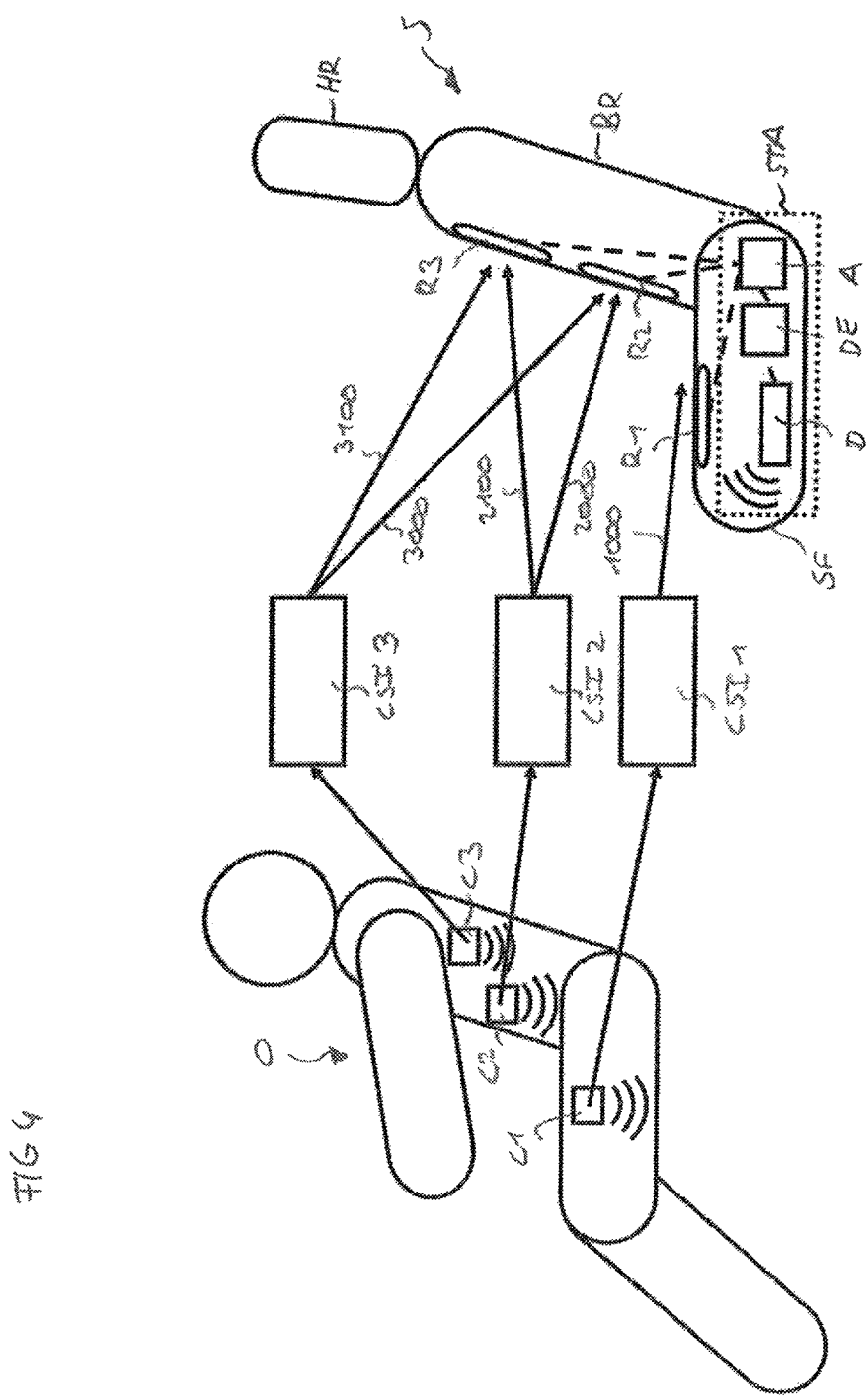
FIG. 4 is a schematic view of a flowchart of another embodiment of the present invention wherein a temperature adjustable seat includes a plurality of temperature adjustable regions for adjusting a temperature of the temperature adjustable seat.

Referring now to FIG. 4, a schematic flowchart is illustrated, which explains how the determined type of detected clothing items C1, C2, C3 is assigned to a specific temperature adjustable region of a plurality of temperature adjustable regions of temperature adjustable seat S.

As already mentioned, temperature adjustable seat S includes three temperature adjustable regions, a first temperature adjustable region R1 arranged in sitting face SF, a second temperature adjustable region R2 arranged in the lower back region of backrest BR and a third temperature adjustable region R3 arranged in the upper back region of backrest BR.

As already mentioned, the procedure may determine from detected clothing item C1 clothing specific information CSI1 "jeans trousers", from detected clothing item C2 clothing specific information CSI2 "silk shirt" and from detected clothing item C3 clothing specific information CSI3 "down jacket".

Once the procedure has performed these steps, the procedure then assigns the determined clothing specific information CSI1, CSI2, CSI3 to specific temperature adjustable regions of the plurality of temperature adjustable regions R1, R2, R3.

That is, clothing specific information CSI1 "jeans trousers" may be assigned to first temperature adjustable region R1 arranged in sitting face SF of temperature adjustable seat S (indicated by arrow 1000); because "trousers" are only in the region of sitting face SF. Clothing specific information CSI2 "silk shirt" may be assigned to second temperature adjustable region R2 and third temperature adjustable region R3 in the lower back region and the upper back region of backrest BR (indicated by arrows 2000 and 2100, respectively); because a "shirt" is located in the upper and lower regions of backrest BR. Likewise, clothing specific information CSI3 "down jacket" may also be assigned to second temperature adjustable region R2 and third temperature adjustable region R3 in the lower back region of the upper back region of backrest BR (indicated by arrows 3000 and 3100, respectively).

The procedure then adjusts a temperature of temperature adjustable seat S either by adjusting a temperature of the assigned temperature adjustable regions or it adjusts the temperature of temperature adjustable seat S by adjusting a temperature of temperature adjustable regions not assigned to the detected clothing items.

As an example, if occupant O wears a down jacket and if the determined clothing specific information CSI3 "down jacket" is assigned to second and third temperature adjustable regions R2, R3, the procedure may adjust a temperature of temperature adjustable seat S by adjusting a temperature of second and third temperature adjustable regions R2, R3, so that occupant O feels the change of temperature quicker in the region of the down jacket. The procedure may, however, adjust the temperature of temperature adjustable seat S also by adjusting only a temperature of first temperature adjustable region R1 (where there is no down jacket). For example, because the system assumes that if occupant O wears a down jacket, occupant O already feels warm and therefore only needs heating in the sitting face SF of temperature adjustable seat S.

In order to change a temperature of temperature adjustable regions R1, R2, R3, adjusting unit A can provide dedicated signals to each temperature adjustable region R1, R2, R3. Thus, each temperature adjustable region R1, R2, R3 can be controlled individually and separately.

Referring now to FIG. 5, a schematic flowchart is illustrated, which explains how a body proportion of occupant O can be taken into account for adjusting a temperature of temperature adjustable seat S.

As with the embodiment shown in connection with FIG. 4, temperature adjustable seat S includes three temperature adjustable regions R1, R2, R3, and the procedure detects three clothing item C1, C2, C3. However, in the embodiment shown in FIG. 5, in order to assign the determined type of detected clothing items C1, C2, C3 to temperature adjustable regions R1, R2, R3, the procedure detects a body proportion P of occupant O. The detection of a body portion P may be done by any suitable means such as using imaging and image processing means. The procedure then assigns the determined type of clothing item C1, C2, C3 to the temperature adjustable region R1, R2, R3 based on the detected body portion P.

As an example, if occupant O is a short occupant, the procedure assigns detected clothing items C2, C3 "silk suit" and "down jacket" only to second temperature adjustable region R2 arranged in the lower back region of backrest BR, as shown in FIG. 5. If occupant O, however, were a tall occupant, the procedure assigned, for example, clothing items C2, C3 to second temperature adjustable region R2 and third temperature adjustable region R3 in the lower back and the upper back regions of backrest BR, respectively. The procedure may also assign clothing item C1 "jeans trousers" to first temperature adjustable region R1 arranged in sitting face SF of temperature adjustable seat S based on the detected body proportion P of occupant O.

Referring now to FIG. 6, a schematic flowchart is illustrated, which explains how a parameter indicative of a material of a seat cover SC of temperature adjustable seat S can be taken into account for adjusting a temperature of temperature adjustable seat S.

In the specific example shown in FIG. 6, temperature adjustable seat S includes a seat cover SC which includes a clothing specific information including a parameter indicative of a material of seat cover SC. For example, seat cover SC may have an RFID tag sewn into or onto seat cover SC which includes clothing specific information regarding a parameter indicative of the material of seat cover SC. Detection unit D may detect the seat cover, determination unit DE may determine the parameter and adjustment unit A may adjust a temperature of temperature adjustable seat S taking into account the determined parameter.

As an example, if seat cover SC includes a leather material, detection unit D detects seat cover SC, determination unit DE determines that seat cover SC is a "leather seat cover" and adjustment unit A generates a seat temperature adjustment signal to first temperature adjustable region R1, second temperature adjustable region R2 and/or third temperature adjustable region R3 which takes into account this additional information. For example, adjustment unit A may generate a seat temperature adjustment signal that causes temperature adjustable regions R1, R2, R3 to increase their temperatures quicker so that occupant O does not have the feeling of a "cold leather seat cover".

Although it is mentioned in the examples, that a temperature of the temperature adjustable seat can be adjusted by increasing the temperature of the seat, it may be also possible to decrease the temperature of the temperature adjustable seat. This may be achieved, for example, by cooling the seat using a fan or other suitable cooling means. Cooling and/or heating may be controlled individually for each temperature adjustable region R1, R2, R3 (or any other addition temperature adjustable region of temperature adjustable seat S not shown).

Although it was mentioned that only backrest BR and sitting face SF include temperature adjustable regions, it is also possible that the above procedure is applied to temperature adjustable regions in or near headrest HR, for example, for heating/cooling the neck region of occupant O.

It should be noted that the above procedure can also detect for each clothing item C1, C2, C3, C4 whether the detected clothing C1, C2, C3, C4 is worn by occupant O, and performs the step of adjusting a temperature of temperature adjustable seat S only, if at least one of the detected clothing items C1, C2, C3, C4 is worn by occupant O, or only, if all detected clothing items C1, C2, C3, C4 are worn by occupant O.

It should be noted that because the above procedure determines the type of the detected clothing item, it is also possible that the procedure can suggest marketing services such as the nearest cleaning or nearest shop for that specific clothing item.

Also, it is possible that the procedure can suggest what piece of clothing item the occupant should wear or remove based on, for example, the outside temperature. As an example, it is 10 degrees outside and before the occupant enters the vehicle, the occupant removes the jacket and places the jacket on the back seat (for example because the occupant knows that inside the vehicle it will be warmer). Then, the procedure adjusts the temperature of the temperature adjustable seat and knows that the jacket is not worn. Then, the sun comes up and the outside temperature is 23 degrees. When the vehicle stops and the occupant wants to get out of vehicle, the procedure informs the occupant that the jacket is no longer needed as the outside temperature is higher than before.

Also, it is possible that the procedure can write additional data to the detected clothing item, like how many times that particular clothing item was worn. The temperature adjustable seat or a controller of the vehicle could then use this additional data to generate suggestions or warnings and transmit the suggestions or warnings to the occupant or another person.

Also, it is possible that the procedure can write additional data to the detected clothing item, like what vehicle was used by the occupant and what vehicle settings were used by the occupant. When the occupant then enters another vehicle, the procedure could then use this additional information to adjust the vehicle settings.

The invention claimed is:

1. A method for adjusting a temperature of a temperature adjustable seat, the method comprising:
   detecting a clothing item of an occupant of the temperature adjustable seat;
   determining a type of the detected clothing item by determining clothing specific information associated with the detected clothing item, the clothing specific information including a parameter indicative of a thermal transfer behavior of the clothing item; and
   adjusting a temperature of the temperature adjustable seat based on the determined type of the detected clothing item.

2. The method of claim 1, wherein the temperature adjustable seat is a temperature adjustable vehicle seat.

3. The method of claim 1, wherein the clothing item is detected by a detection unit included in the temperature adjustable seat and/or wherein the type of the detected clothing item is determined by a determination unit included in the temperature adjustable seat.

4. The method of claim 1, wherein the clothing specific information is customizable to personal preferences of the occupant.

5. The method of claim 1, wherein the step of determining a type of the detected clothing item further comprises:
   comparing the determined type of the detected clothing item with a predetermined reference information; and
   generating a seat temperature adjustment signal based on the comparison.

6. A method for adjusting a temperature of a temperature adjustable seat, the method comprising:

detecting a plurality of clothing items of an occupant of the temperature adjustable seat;

determining for each detected clothing item of the plurality of detected clothing items a type of the detected clothing item;

selecting from the plurality of detected clothing items at least one clothing item that is considered to be taken into account for adjusting a temperature of the temperature adjustable seat based on the determined type of each detected clothing item; and adjusting the temperature of the temperature adjustable seat based on the determined type of the selected at least one clothing item.

7. The method of claim 1, wherein the temperature adjustable seat includes a plurality of temperature adjustable regions and the method further comprises:

assigning the determined type of the detected clothing item to at least one of the plurality of temperature adjustable regions; and performing the step of adjusting a temperature of the temperature adjustable seat by
adjusting a temperature of the at least one assigned temperature adjustable region; and/or
adjusting a temperature of at least one temperature adjustable region not assigned to the determined type of the detected clothing item.

8. The method of claim 7, wherein the step of assigning the determined type of the detected clothing item to at least one of the plurality of temperature adjustable regions further comprises:

detecting a body proportion of the occupant; and
assigning the determined type of the detected clothing item with at least one of the plurality of temperature adjustable regions based on the detected body proportion.

9. The method of claim 1, further comprising:
determining whether the temperature adjustable seat is occupied; and
detecting the clothing item of the occupant of the temperature adjustable seat only if the temperature adjustable seat is occupied.

10. The method of claim 1, wherein the temperature adjustable seat includes a seat cover and the method further comprises:

determining a parameter indicative of a material of the seat cover; and
adjusting a temperature of the temperature adjustable seat based on the determined parameter.

11. A seat temperature adjustment assembly for adjusting a temperature of a temperature adjustable seat, the seat temperature adjustment assembly configured to perform the method of claim 1.

12. A temperature adjustable seat, comprising:
at least one temperature adjustable region configured to adjust a temperature of the temperature adjustable seat; and
a seat temperature adjustment assembly of claim 11, wherein the seat temperature adjustment assembly is connected to the at least one temperature adjustable region for adjusting a temperature of the at least one temperature adjustable region.

13. The temperature adjustable seat of claim 12, wherein the temperature adjustable seat is a temperature adjustable vehicle seat.

14. The method of claim 2, wherein the clothing item is detected by a detection unit included in the temperature adjustable seat and/or wherein the type of the detected clothing item is determined by a determination unit included in the temperature adjustable seat.

* * * * *